(12) United States Patent
Brackemyer et al.

(10) Patent No.: US 8,662,292 B2
(45) Date of Patent: Mar. 4, 2014

(54) CONVEYOR BELT ASSEMBLY

(71) Applicant: Service Industries, LLC, Rolling Meadows, IL (US)

(72) Inventors: Zachary Brackemyer, Hampshire, IL (US); Jeff Dean, Hampshire, IL (US); Danny Gonzalez, Lake Villa, IL (US); Gino Rigitano, Bartlett, IL (US); Jerral Richardson, Kenosha, WI (US)

(73) Assignee: Service Industries, LLC, Rolling Meadows, IL (US)

( * ) Notice: Subject to any disclaimer, the term of this patent is extended or adjusted under 35 U.S.C. 154(b) by 0 days.

(21) Appl. No.: 13/627,754

(22) Filed: Sep. 26, 2012

(65) Prior Publication Data

US 2013/0087435 A1    Apr. 11, 2013

Related U.S. Application Data

(60) Provisional application No. 61/539,460, filed on Sep. 26, 2011.

(51) Int. Cl.
*B65G 21/22* (2006.01)
*B65G 15/62* (2006.01)
*B65G 17/18* (2006.01)

(52) U.S. Cl.
CPC ............. *B65G 21/22* (2013.01); *B65G 15/62* (2013.01); *B65G 17/18* (2013.01)
USPC .................... 198/841; 198/836.3; 198/860.3; 198/494

(58) Field of Classification Search
USPC ......... 198/841, 836.1, 836.3, 860.3, 493–499
See application file for complete search history.

(56) References Cited

U.S. PATENT DOCUMENTS

| | | | | |
|---|---|---|---|---|
| 2,600,056 A | * | 6/1952 | Jones | 198/494 |
| 3,800,938 A | * | 4/1974 | Stone | 198/841 |
| 3,824,067 A | * | 7/1974 | Voshel | 432/74 |
| 4,934,516 A | * | 6/1990 | Dugan | 198/836.4 |
| 4,944,384 A | * | 7/1990 | Herron | 198/494 |
| 5,031,757 A | * | 7/1991 | Draebel et al. | 198/852 |
| 5,605,219 A | * | 2/1997 | Zimmerman et al. | 198/495 |
| 7,137,506 B2 | * | 11/2006 | Munoz-Guerra et al. | 198/860.2 |
| 2004/0238334 A1 | * | 12/2004 | Abbestam et al. | 198/860.1 |
| 2013/0180833 A1 | * | 7/2013 | Olsen et al. | 198/841 |

* cited by examiner

*Primary Examiner* — Mark A Deuble
(74) *Attorney, Agent, or Firm* — Pauley Petersen & Erickson

(57) ABSTRACT

A conveyor belt assembly with a housing profile that protects components positioned in an interior of the housing from spilt products and is easier to clean than previously known conveyor belt assemblies. The conveyor belt assembly of this invention includes a frame with a sloped surface positioned under the conveyor belt such that spilt product that falls through the conveyor belt lands on the sloped surface and gravity pulls the spilt product off the sloped surface to a side of the housing for easy clean up.

20 Claims, 4 Drawing Sheets

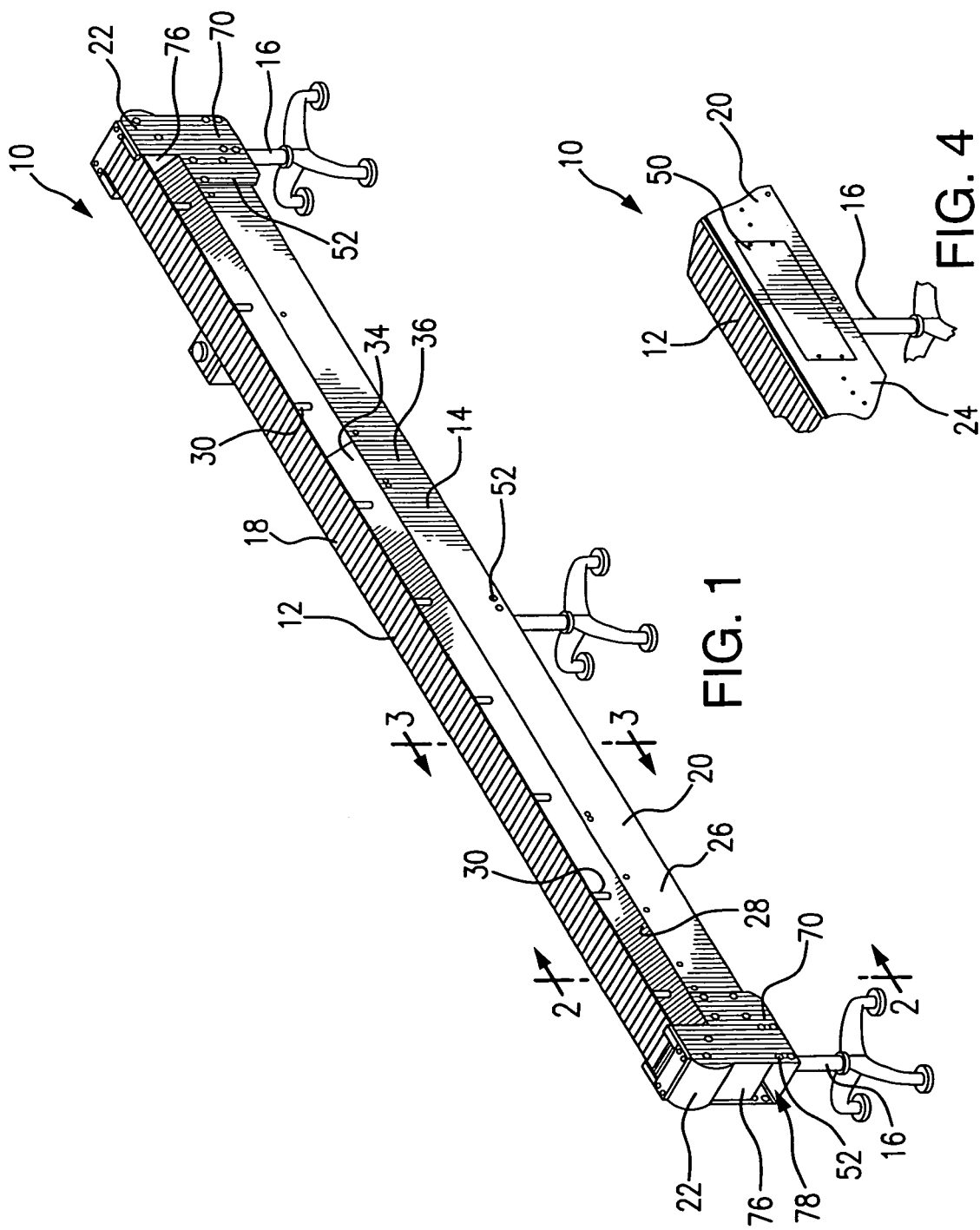

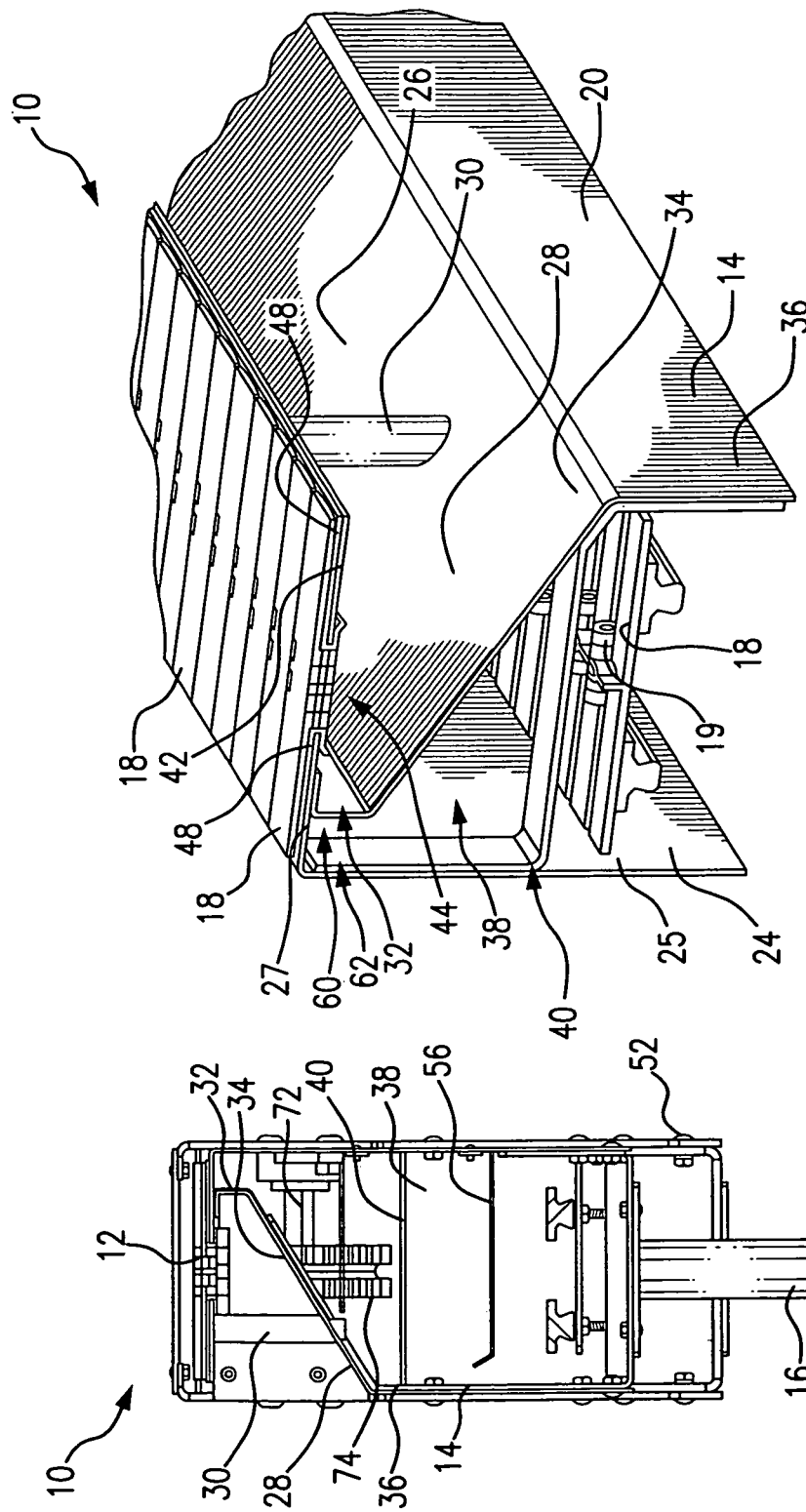

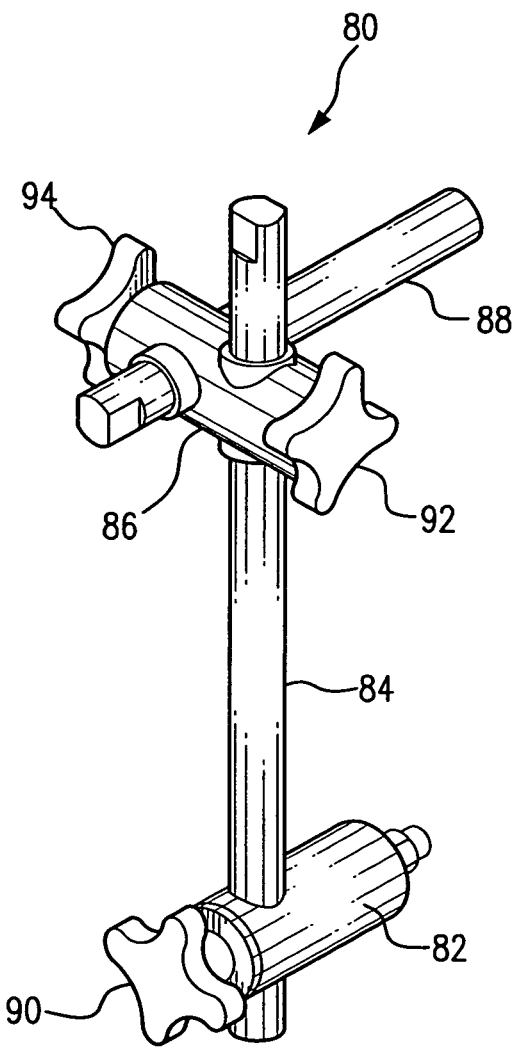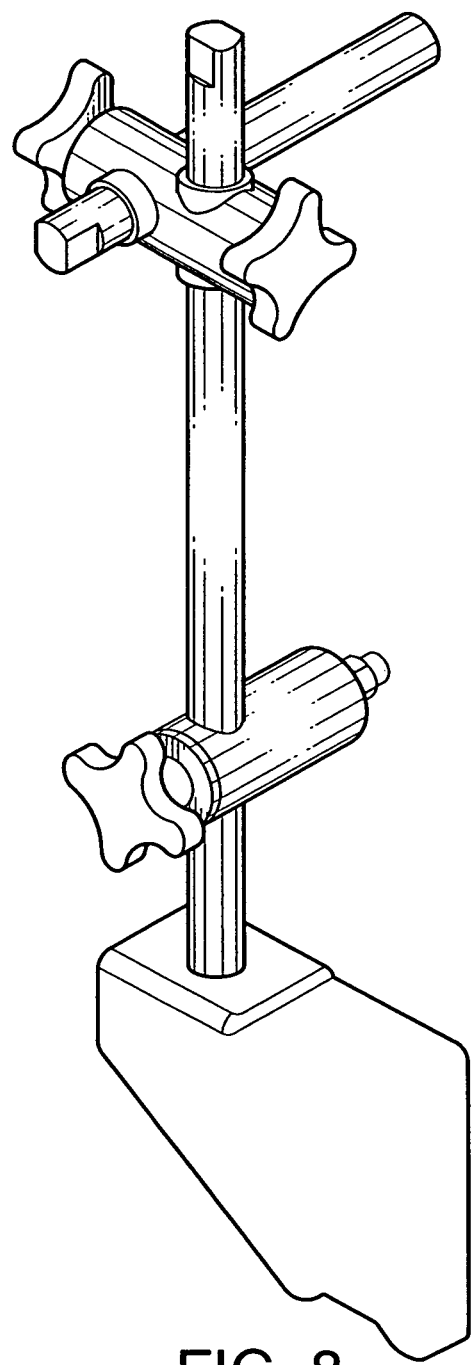
FIG. 7
FIG. 8
PRIOR ART

CONVEYOR BELT ASSEMBLY

CROSS REFERENCE TO RELATED APPLICATION

This Application claims the benefit of U.S. Provisional Patent Application Ser. No. 61/539,460, filed 26 Sep. 2011, which is incorporated herein by reference.

BACKGROUND OF THE INVENTION

1. Field of the Invention

This invention relates to a conveyor belt assembly for transporting products, particularly pharmaceutical, nutraceutical and food products. More specifically, this invention relates to a conveyor belt assembly comprising a unique profile that provides for easy cleaning and an internal channel for passing wires, hoses and cables to maintain a clean, safe and hazard free system.

2. Description of Prior Art

Conveyor belt assemblies, also known as table top conveyors, are often used in the processing and packaging of products in the pharmaceutical, nutraceutical and food industries. These conveyors are particularly useful to fill packages, such as bottle and boxes, with products, such as pills, tablets, powders, foods and liquids.

Known conveyors generally comprise an upside-down U-shaped frame with two side support members running parallel to each other and two top surfaces connected to each other to create a hood with a channel between. A chain-type conveyor belt is supported on the hood of the U-shaped frame with a spine of the conveyor belt positioned in the channel.

These known conveyor belt systems are often operated at high rates of speed often causing the conveyor belt to vibrate and the products to be spilled onto the conveyor belt, especially during the process of filling the containers. The spilled product lands on the chain conveyor belt and falls through the gaps between the links and becomes trapped between the hood of the frame and the conveyor belt. Additionally, some of the spilt product can pass through the channel in the top of the frame and into the area under the frame, landing on the conveyor belt return and other components positioned within the frame. The spilled product can damage the machine and/or cause the conveyor belt to wear prematurely. Furthermore, spilt product can be difficult to remove and may require a thorough clean-up that includes removing the conveyor belt from the assembly. Cleaning the conveyor belt assembly in this way can be very time consuming and cause an operator to incur additional unnecessary costs.

Because of concerns of product falling through the conveyor belt and through the frame assembly, known conveyor belt assemblies generally position a drive system for the conveyor belt outside of the frame assembly or separate from the conveyor belt assembly to prevent damage to the drive system. With the drive system positioned on an outside of the frame assembly, a chain guard is required to protect the operator from the drive chain. The drive system and the chain guard positioned on the outside of the frame assembly increases the footprint of the conveyor belt assembly and makes side transfers to another conveyor belt or other equipment more difficult.

As such, there is a need for a conveyor belt assembly that minimizes the short-comings of known conveyor belt systems.

SUMMARY OF THE INVENTION

A general object of this invention is to provide a conveyor belt assembly with a housing profile that protects components positioned in an interior of the housing and is easier to clean than previously known conveyor belt assemblies. The conveyor belt assembly of this invention includes a frame with a profile having a sloped surface positioned under the conveyor belt. Preferably, the profile includes no horizontal surface on which spilt product may become trapped. The sloped surface protects components of the conveyor belt assembly which are positioned inside of the housing and provides for easier clean-up between change-overs.

In a preferred embodiment of this invention, the housing includes a rear frame member connected to a front frame member. The rear frame member preferably comprises an inverted L-shape with a top comprising a rear frame member horizontal support. The front frame member preferably comprises a sloped frame, a plurality of support members and a front frame member horizontal support. In a preferred embodiment, the sloped frame comprises an upper portion, a sloped surface portion and a lower portion. The upper portion is preferably connected to the rear frame member with a weld connection. At a bottom of the upper portion, the sloped frame transitions to the sloped surface which extends away from the rear frame member at an angle to create an interior area for the storage and passage of components of the conveyor belt assembly and components of machinery locating in proximity to the conveyor belt assembly. The angle of the sloped surface may range from 5° to 85° from horizontal and preferably comprises a steep angle ranging from 30° to 80°. With this arrangement, product that falls through the conveyor belt lands on the sloped surface and gravity pulls the product down the sloped surface until it falls off an edge of the housing and onto to the ground along a side of the conveyor belt assembly for easy clean up. Furthermore, the sloped surface is exposed under the conveyor belt and can be quickly wiped down by an operator minimizing the need for costly clean-ups that entail shutting down the conveyor belt assembly.

In a preferred embodiment of this invention, the plurality of support members are mounted to the sloped surface and extend upwards at a generally vertical direction. The front frame horizontal support is positioned on top of the plurality of supports to provide, along with the rear frame horizontal support, a surface for the conveyor belt to move on. In a preferred embodiment, the front frame horizontal support is parallel and planar to the rear frame horizontal support with a gap between for a spine of the conveyor belt to pass through. In a preferred embodiment, each of the front frame horizontal support and the rear frame horizontal support include a guide strip that the conveyor belt is positioned on. The guide strip preferably provides a reduced-friction sliding surface and wear protection for the conveyor belt assembly.

In a preferred embodiment of this invention, the rear frame member and the front frame member form a canopy to protect an internal passageway. The internal passageway provides a protected area for the drive mechanisms, the return conveyor belt, wires, cables, pneumatic tubes and other components of the conveyor belt system to be positioned. Additionally, the internal passageway may be used to protect wires, tubing and other components of other machinery positioned alongside the conveyor belt assembly. The sloped surface of this invention protects the components positioned in the internal passageway from spilt products, such a pills and powders. The internal area also keeps wires, cables and pneumatic tubing of the conveyor belt assembly and other machinery off the floor and out of the operator's way. In a preferred embodiment, the internal passageway includes a support for supporting the wires, cables and/or pneumatic tubes. In a preferred embodiment, the conveyor belt assembly further includes a duct to connect the wires from the conveyor to a machine electrical cabinet.

This invention may further include guide rails mounted to the housing that are easier to clean than previously know guide rails. The guide rails preferably comprise tubular rails made from stainless steel with a joint that provides for inward and vertical adjustment of the guide rail. The guide rail further includes a doweled stainless steel rod at a base, which is much easier to clean with fewer surfaces on which spilt product can be trapped on.

BRIEF DESCRIPTION OF THE DRAWINGS

In the detailed description that follows, reference will be made to the following figures:

FIG. 1 is an isometric view of a conveyor belt assembly according to one preferred embodiment of this invention.

FIG. 2 is a cross-sectional side view of the conveyor belt assembly of FIG. 1 at line 2-2.

FIG. 3 is a cross-sectional isometric view of the conveyor belt assembly of FIG. 1 at line 3-3.

FIG. 4 is a portion of a rear view of the conveyor belt assembly of FIG. 1.

FIG. 7 is an isometric view of a guard rail for a conveyor belt assembly according to one preferred embodiment of this invention.

FIG. 8 is an isometric view of a prior art guard rail.

DETAILED DESCRIPTION OF THE INVENTION

Figure 6:
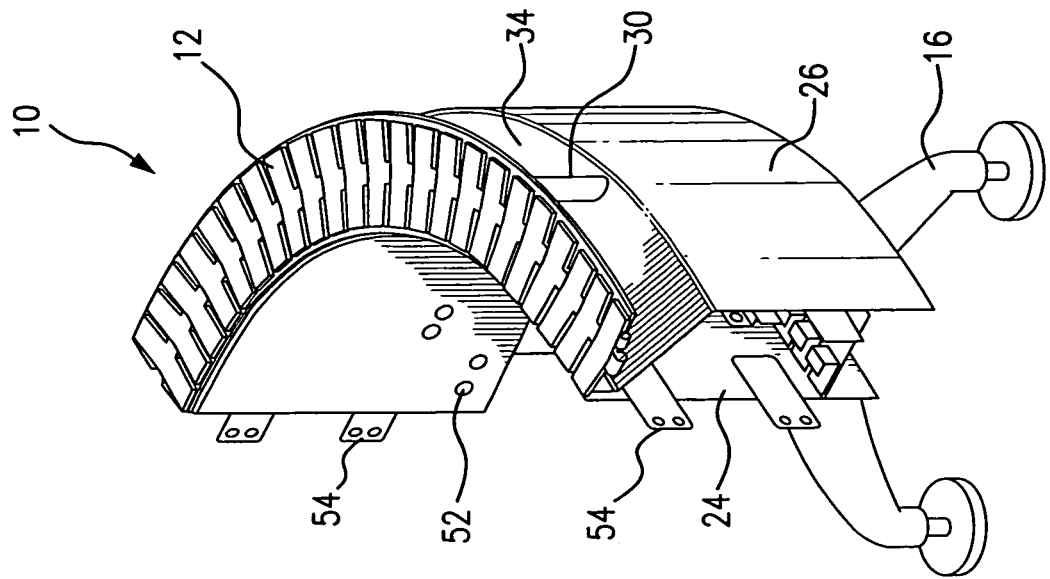
FIG. 6 is an isometric view of a curved conveyor belt assembly according to another embodiment of this invention.

FIG. 1 illustrates a preferred embodiment of a conveyor belt assembly 10 of this invention. The conveyor belt assembly 10 comprises a conveyor belt 12 positioned on a housing 14 and a plurality of supports 16 supporting the housing 14. In the embodiment of FIG. 1, the conveyor belt assembly 10 is a straight, dual lane system. However, the conveyor belt assembly 10 is not limited to this embodiment and may comprise alternative embodiments, including, but not limited to, single lane systems, for example FIG. 5, and conveyor belt assemblies having curved sections, for example FIG. 6.

In a preferred embodiment, the conveyor belt 12 comprises a plurality of links 18 pivotally joined to each other by connecting pins providing pivot points 19 between the links 18. The pivot points 19 and links 18 allow the conveyor belt 12 to transition over a drive sprocket and accommodate curves in the conveyor belt assembly 10. The conveyor belt 12 is preferably manufactured from stainless steel. Alternatively, the conveyor belt 12 may be manufactured from any type of material including, but not limited to, any type of metal, plastic and composite materials. In another embodiment of this invention, the conveyor belt 12 may not comprises a plurality of links and instead may comprise a band in a loop that is manufactured of a flexible material such as, but not limited to, rubber, nylon, weaved metal fibers and cloth.

Figure 5:
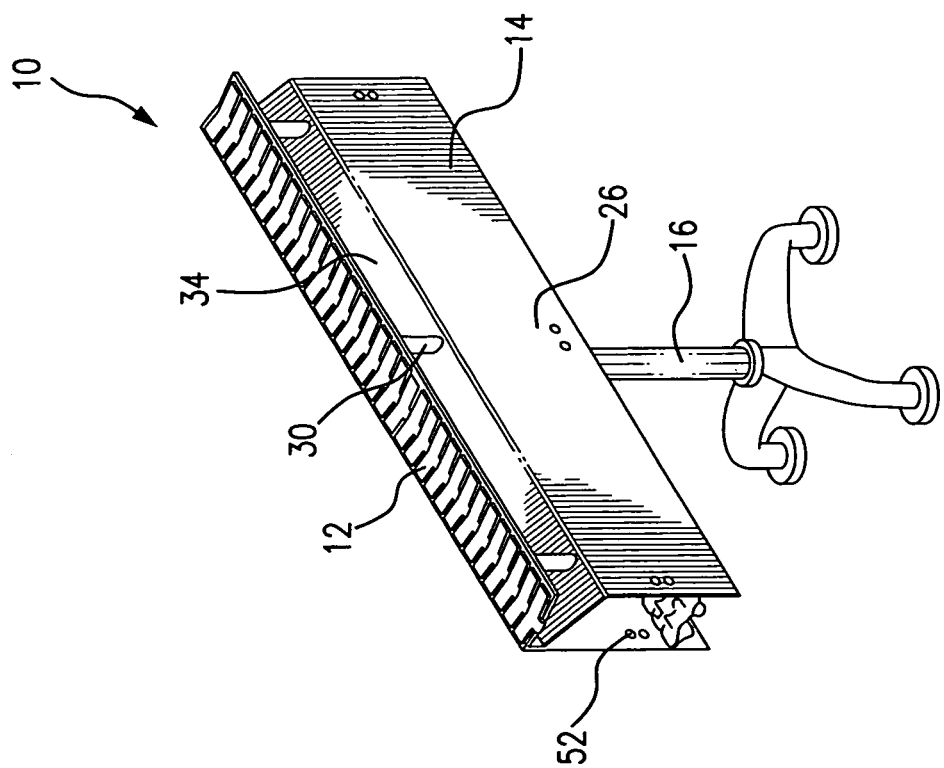
FIG. 5 is an isometric view of a conveyor belt assembly according to another embodiment of this invention.

In a preferred embodiment of this invention, the housing 14 includes a main section 20 and a pair of return guides 22. In the embodiment of FIG. 1, the main section 20 is a straight length, however, it should be understood that the main section 20 may comprises a curved section or may comprise a conveyor path with both straight and curved sections. Alternatively, the housing 14 may comprise the main section 20 without the return guide 22. For example FIG. 5 shows a straight, single lane housing 14 without return guides and FIG. 6 shows a curved, single lane housing without return guides. In a preferred embodiment of this invention, the main sections 20 and the return guides 22 are designed as modular components that can be bolted together with carriage bolts 52 and connecting brackets 54 to create a conveyor belt assembly 10 with a selection of straight and curved lengths to create a desired conveyor path.

In the embodiment of this invention shown in FIGS. 1 and 2, the return guide 22 comprises a pair of outside walls 70 with a shaft 72 and a conveyor belt gear 74 rotatably connected between the pair of spaced walls 70. The pair of outside walls 70 are preferably sized to be matched to the main section housing 14 and connected with a plurality of carriage bolts 52. The return guide 22 further includes sidewalls 76 to protect the operator from pinch points within the housing, such as the conveyor belt gear 74. The return guide 22 preferably further includes an open end 78 near the bottom of the return guide and beneath one of the sidewalls 76 to simplify the cleaning of the conveyor belt assembly 10. While transporting product on the conveyor belt 12, product is often spilled onto the conveyor belt 12. This spilt product is carried along the conveyor belt 12 until it reaches the conveyor belt gear 74. As the conveyor belt 12 is wrapped downwards around the conveyor belt gear 74 for a return path, the spilt product is dumped within the return guide 22. The open end 78 is preferably positioned near a landing spot for the spilt product allowing for visual inspection and easy clean-up of the spilt product by the operator.

In a preferred embodiment of this invention, the main section 20 of the housing 14 comprises a rear frame member 24 and a front frame member 26. FIGS. 2 and 3 show two perspectives of the main section 20 of the housing 14. FIG. 2 shows a cross section side view of the housing 14, illustrating the main section 20 connected to the return guide 22. FIG. 3 shows a cross section isometric view of the main section 20. In this embodiment, the rear frame member 24 comprises an inverted L-shaped frame comprising a rear frame member vertical support 25 and a rear frame member horizontal support 27. Alternatively, the rear frame member 24 may comprise any shape for accommodating storage of components within the housing 14. In a preferred embodiment, the housing 14 is constructed of stainless steel. Alternatively, the housing 14 may be manufacture from any type of material with the strength and durability to support the components of a conveyor belt assembly 10 including, but not limited to, any type of metal or composite materials.

In a preferred embodiment of this invention, the front frame member 26 comprises a sloped frame 28, a plurality of support members 30 and a front frame member horizontal support 42. As best shown in FIG. 3, the sloped frame 28 further comprises an upper section 32, a sloped section 34, and a lower section 36. In this embodiment, the upper section 32 comprises an inverted L-shape that is fastened to an underside of the rear frame member horizontal support 27 with a weld connection. Alternatively, the upper section 32 may comprise another shape, including a flat shape, and the connection can be formed using any method known to those skilled in the art including, but not limited to, a connection with a fastener, such as a bolt or rivet, or formed as an integral piece. In the embodiment of FIG. 3, the upper section 32 is connected to the rear frame member 24 with a space 60 between the upper section 32 and the rear frame member vertical support 25. The space 60 is a rear wall upper support chamber 62 which can be used for running and supporting wires and other components, especially components that need to be isolated. Alternatively, the upper section 32 may abut vertical support of the rear frame member 24 eliminating the rear wall upper support chamber 62.

In a preferred embodiment of this invention, the sloped section 34 of the sloped frame 28 extends at an angle from the upper section 32 and away from the rear frame member vertical support 25. The angle may range from 5° to 85° from horizontal and preferably comprises a steep angle ranging from 30° to 80°. Opposite the upper section 32, the sloped section 34 of the sloped frame 28 transitions to the lower section 36 which extends downward in an approximately vertical direction. With this arrangement, the spilt product that falls through the conveyor belt 12 lands on the sloped surface 34 and slides on the sloped surface and falls to the ground along a side of the conveyor belt assembly 10 for easy clean up. Furthermore, the sloped surface 34 is exposed to an operator allowing the sloped surface 34 to be quickly wiped down by an operator minimizing the need for costly clean-ups that entail shutting down the conveyor belt assembly 10.

As best shown in FIG. 3, the conveyor belt assembly 10 preferably further includes a bracket 40 that connects between the rear frame member 24 and the front frame member 26. The bracket 40 increases the rigidity of the housing 14 and reduces the number of support members 30 that are required to support the conveyor belt 12. In the embodiment of FIG. 3, the bracket 40 is a strip of steel that is welded to the rear frame member 24 and the front frame member 26. Alternatively, the bracket 40 may comprise any type of material strong enough to increase the rigidity of the conveyor belt assembly 10.

In a preferred embodiment of this invention, a plurality of support members 30 are mounted to the sloped section 34 to provide additional support for the conveyor belt 14. Preferably, each of the support members 30 comprises a cylindrical shape, minimizing an area between the support member 30 and the sloped section 34 in which spilt product may become trapped. In the embodiment of FIGS. 1-3, the support members 30 are bolted to the sloped section 34. However, the support member 30 may be connected to the sloped section 34 with any means known to one of skill in the art including, but not limited to, a weld connection and being integrally formed to the sloped section 34. As best shown in FIG. 3, the front frame member horizontal support 42 is positioned on top of the plurality of support members 30 along a length of the conveyor belt assembly 10. The front frame member horizontal support 42 is preferably designed to run parallel and planar to the rear frame member horizontal support 27 with a gap 44 between the front frame member horizontal support 42 and the rear frame member horizontal support 27. The gap 44 provides an area for the spine of the conveyor belt 12 to run between as the conveyor belt 12 runs along the front frame member horizontal support 42 and the rear frame member horizontal support 27. In a preferred embodiment, a front guide strip 46 is positioned on the front frame member horizontal support 42 and a rear guide strip 48 is positioned on the rear frame member horizontal support 27. The guide strips 46, 48 preferably provide a smooth surface for the conveyor belt 12 to slide along that is resistant to the wear caused by the conveyor belt 12.

With the arrangement described above, the rear frame member 24 and the front frame member 26 form an internal passageway 38 which can be used to run wires, communication cabling, pneumatic tubing, hoses, the conveyor belt return and other components to maintain a clean, safe and hazard free system. It should be noted, that the internal passageway 38 may be also used to run wires, communication cabling, pneumatic tubing, hoses and other components from machinery used with the conveyor belt assembly 10. As described above, the sloped surface 34 of the front frame member 24 protects the internal passageway 38 from spilt product. In a preferred embodiment of this invention, the internal passageway 38 includes an internal passageway bracket 56 mounted to the housing 14. The internal passageway bracket 56 supports wires, cables and pneumatic tubes, keeping them off the floor and out of an operator's way, which can be a tripping hazard. In a preferred embodiment, the conveyor belt assembly 10 includes a plurality of internal passageway brackets 56, allowing for separation of the wires, cables and pneumatic tubes. In a preferred embodiment of this invention, a drive chain is also positioned within the housing reducing the footprint of the conveyor belt assembly 10 and allowing for easier side transfers onto another conveyor belt or machinery.

As best shown in FIG. 4, the rear frame member 24 preferably includes one or more access panels 50 to provide access to the internal passageway 38. Alternatively, the access panels 50 may be positioned on the front frame member 24. The access panels allow an operator to access the wires, cables, pneumatic tubes, the conveyor belt and the drive chain positioned within the housing 14 easily for repairs and general maintenance.

In a preferred embodiment of this invention, the conveyor belt assembly 10 includes a guide rail assembly 80 that supports the containers moving on the conveyor belt 12 from tipping over. FIG. 7 shows a preferred embodiment of the rail assembly 80. In this embodiment, the rail assembly 80 includes a bottom mounting standoff 82, a riser 84, a rail support 86 and a rail 88. The bottom mounting standoff 82 is preferably cylindrical. This cylindrical shape eliminates a catch point for spilt product. FIG. 8 shows a previously known guide rail assembly with surfaces that trapped spilled product. The bottom mounting standoff 82 also includes a lower vertical adjustment knob 90 for adjusting the position of the riser 84 to the bottom mounting standoff 82. The rail support 86 includes an upper vertical adjustment knob 92 for adjusting a position of the riser 84 to the rail support 86. The rail support 86 also includes an inward adjustment knob 94 for adjusting a position of the rail 88 to the rail support 86.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A conveyor belt assembly for transporting a product comprising:
   a housing comprising a rear frame member connected to a front frame member and forming a canopy over an internal passageway;
   the rear frame member including a rear frame horizontal support;
   the front frame member including a sloped surface, a support member extending from the sloped surface and a front frame horizontal support positioned on the support member;
   a conveyor belt positioned to slide along the rear frame horizontal support and the front frame horizontal support; and
   wherein the sloped surface is located under the conveyor belt allowing the product to slide along the sloped surface and fall to a side of the housing.

2. The conveyor belt assembly of claim 1, wherein the sloped surface extends downward at an angle of 30° to 80° from horizontal.

3. The conveyor belt assembly of claim 1, wherein at least one of a conveyor belt return path, a wire and a pneumatic tube are positioned within the internal passageway.

4. The conveyor belt assembly of claim 3 further comprising:
- a wire way support connected to at least one of the front frame member for supporting at least one of the wire and the pneumatic tube.

5. The conveyor belt assembly of claim 1 further comprising:
- a bracket connecting the rear frame member and the front frame member.

6. The conveyor belt assembly of claim 1 further comprising:
- a pair of guide strips, each guide strip positioned on one of the rear frame horizontal support and the front frame horizontal support.

7. The conveyor belt assembly of claim 1, wherein the support member comprises a cylindrical shape.

8. The conveyor belt assembly of claim 1 further comprising:
- a guide rail assembly connected to the housing and extending alongside the conveyor belt.

9. The conveyor belt assembly of claim 8, wherein the guide rail assembly comprises a mounting standoff, a riser and a rail, wherein the mounting standoff, the riser and the rail each comprise a cylindrical shape.

10. The conveyor belt assembly of claim 1 further comprising:
- A drive system for the conveyor belt positioned within the internal passageway.

11. The conveyor belt assembly of claim 1 further comprising:
- an access panel positioned in at least one of the rear frame member and the front frame member.

12. The conveyor belt assembly of claim 1 further comprising:
- a return guide connected to an end of the housing, the return guide including a conveyor belt gear to engage the conveyor belt.

13. The conveyor belt assembly of claim 12, wherein the return guide includes an opening for cleaning the product spilled with the housing.

14. A conveyor belt assembly for transporting a product comprising:
- a housing comprising a rear frame member connected to a front frame member and forming a canopy over an internal passageway, the rear frame member including a rear frame horizontal support, and the front frame member including a sloped surface, a cylindrical support member extending from the sloped surface and a front frame horizontal support positioned on the cylindrical support member;
- a conveyor belt positioned to slide along the rear frame horizontal support and the front frame horizontal support;
- a pair of return guides, each return guide positioned on an end of the housing, the return guides including a conveyor belt gear to engage the conveyor belt and rotate the conveyor belt to return through the internal passageway; and
- wherein the sloped surface is located under the conveyor belt allowing the product to slide along the sloped surface and fall to a side of the housing.

15. The conveyor belt assembly of claim 14, wherein the sloped surface extends downward at an angle of 30° to 80° from horizontal.

16. The conveyor belt assembly of claim 14 further comprising:
- a wire way support connected to at least one of the front frame member for supporting at least one of a wire, a cable or a pneumatic tube in the internal passageway.

17. The conveyor belt assembly of claim 14 further comprising:
- an access panel positioned in at least one of the rear frame member and the front frame member.

18. The conveyor belt assembly of claim 14 further comprising:
- a guide rail assembly connected to the housing and extending alongside the conveyor belt, the guide rail assembly comprising a mounting standoff, a riser and a rail and wherein the mounting standoff, the riser and the rail each comprise a cylindrical shape.

19. The conveyor belt assembly of claim 14 further comprising:
- a drive system for the conveyor belt positioned within the internal passageway.

20. The conveyor belt assembly of claim 14 further comprising an upper support chamber between the rear frame member and the front frame member and directly under the rear frame horizontal support.

* * * * *